June 16, 1953　　　J. F. NAYLOR　　　2,642,015
DOUGH BREAK

Filed Oct. 30, 1951　　　　　　　　　　　　　3 Sheets-Sheet 1

Inventor
JOSEPH FRANCIS NAYLOR
By
Attorney

Inventor
JOSEPH FRANCIS NAYLOR
By
Attorney

Patented June 16, 1953

2,642,015

UNITED STATES PATENT OFFICE 2,642,015

DOUGH BREAK

Joseph Francis Naylor, Newton-le-Willows, England, assignor to T. & T. Vicars Limited, Earlestown, Newton-le-Willows, England, a British company Application October 30, 1951, Serial No. 253,818
In Great Britain November 6, 1950

2 Claims. (Cl. 107—12)

The invention relates to dough break apparatus of the type including dough feed means, first and second squeeze rollers and a conveyor belt associated with the first squeeze roller to convey automatically a dough sheet, after passage between the squeeze rollers, to a position adjacent the dough feed means.

It is an object of the present invention to provide a dough break of the type set forth wherein a dough sheet may, after a required number of passages between the squeeze rollers, be conveniently discharged from the dough break apparatus.

According to the present invention, in a dough break of the type set forth a gate member is mounted at the exit side of the bight of said squeeze rollers, means being provided to displace said gate member from one position in engagement with the second squeeze roller, to direct the dough sheet to between the conveyor belt and the first squeeze roller to another position in engagement with the first squeeze roller to direct the dough sheet from said bight away from the dough break.

In a preferred form of construction, an end of the conveyor, in said one position of the gate member lies in the path of displacement of the gate member and is mounted to be displaced out of the said path of displacement and to control displacement of the gate member.

The gate member is preferably pivotally mounted and resiliently urged to said another position thereof, and the said end of the conveyor belt preferably passes around a roller carried by a pivotally mounted arm, the gate member being displaceable to said one position thereof by said arm.

Figure 1:
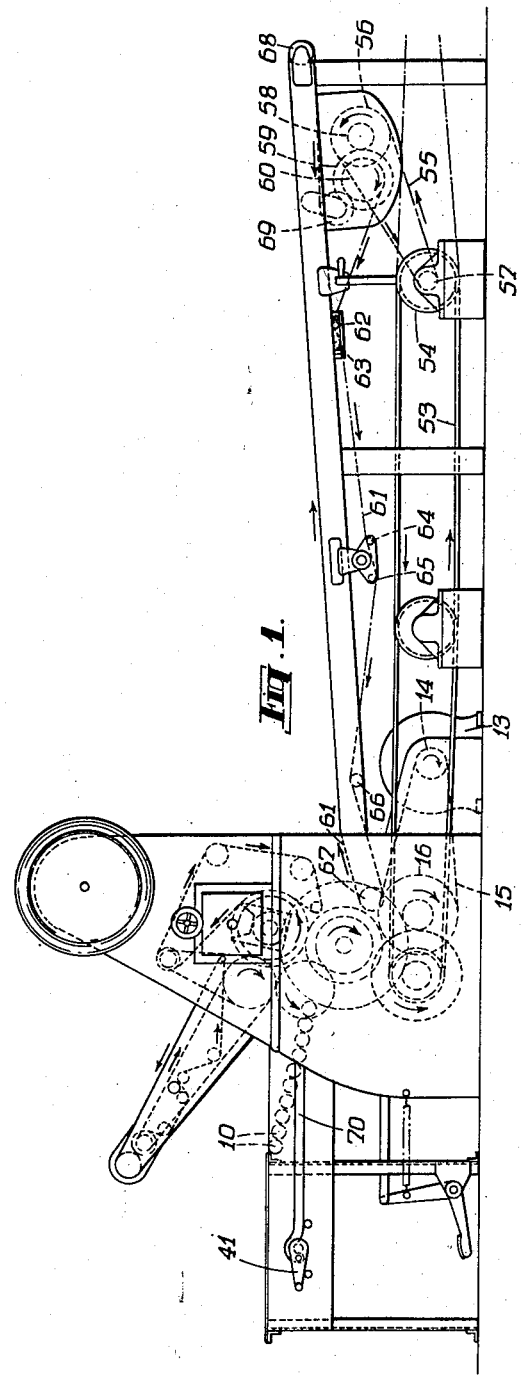
Figure 2:
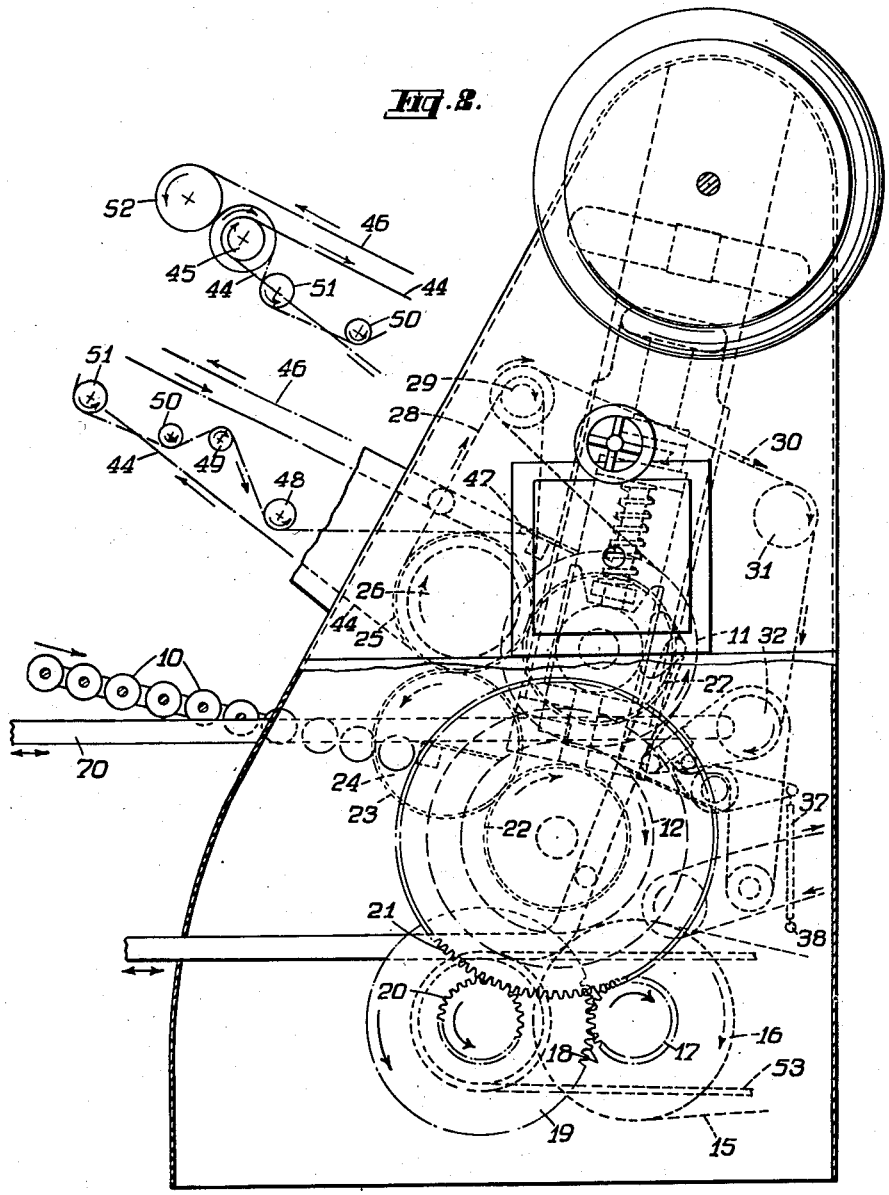
Figure 3:
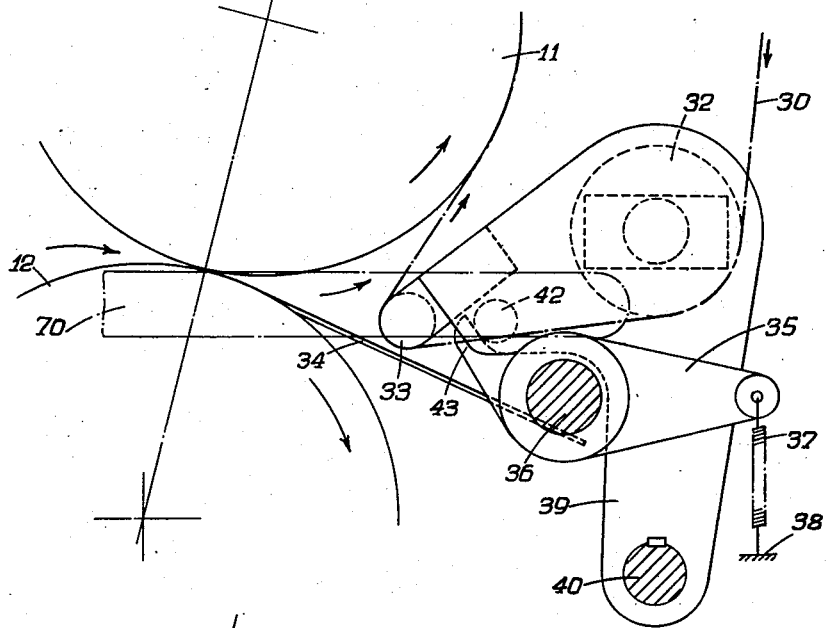
Figure 4:
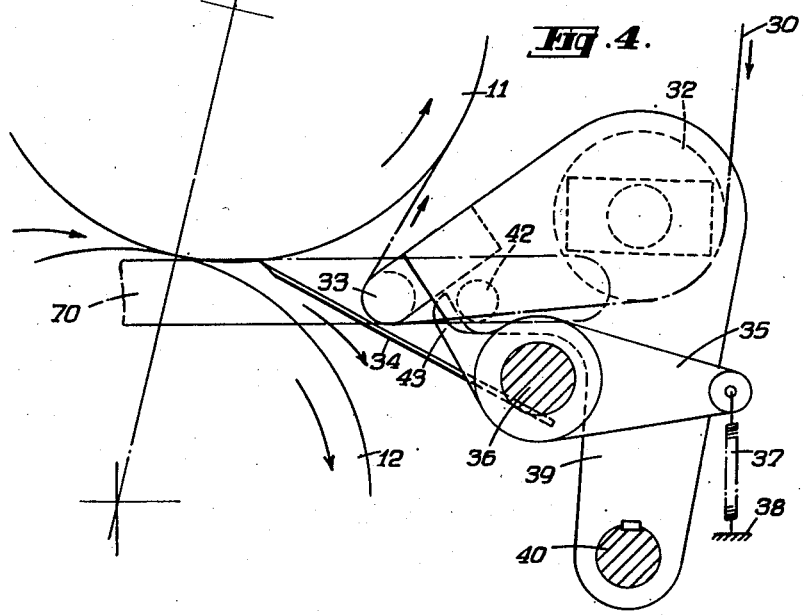

The invention will be further described by way of example with reference to the accompanying drawings, in which:

Fig. 1 is a side elevation of a machine incorporating a dough break according to the present invention, Fig. 2 shows in more detail an enlarged view of the dough break and Figs. 3 and 4 show diagrammatically the upper and lower squeeze rollers, the lower end of the conveyor belt associated with the upper squeeze roller, and a gate member (the conveyor belt and gate member being shown in alternative positions).

In the drawings, an inclined feed table having transverse rollers 10 is disposed forwardly of upper and lower squeeze rollers 11 and 12 respectively. A prime mover 13 having a pulley 14 drives pulley 16 by means of a belt 15. Teeth 17 on pulley 16 are in mesh with teeth 18 on wheel 19. Teeth 20 on wheel 19 are in mesh with teeth 21 on drive wheel associated with the lower squeeze roller 12. Teeth 22 on drive wheel associated with lower squeeze roller 12 are in mesh with teeth 23 on wheel 24. Teeth 23 are also in mesh with teeth 25 on wheel 26. Teeth 25 are also in mesh with teeth 27 on drive wheel associated with the upper squeeze roller 11.

A drive belt 28 passes around the pulley associated with wheel 26 and drive pulley 29. A conveyor belt 30 passes around rollers 31, 32, 33, part of the upper squeeze roller 11, and the roller associated with drive pulley 29.

A gate member in the form of a blade 34 is mounted at the exit side of the bight of the squeeze rollers and associated with the conveyor belt. The blade 34 is mounted on a transverse shaft 36. The blade is pivotal between a lower position (as shown in Fig. 3) wherein the blade engages the lower squeeze roller, and an upper position (as shown in Fig. 4) wherein the blade engages the upper squeeze roller. The blade is resiliently urged to the latter position by means of a spring 37 which extends between the arm 35 secured to shaft 36 and a fixed part 38 of the machine.

The rollers 32, 33 are carried on an arm 39 pivotally mounted on a transverse shaft 40. The arm 39 is pivotal between an inner position (as shown in Fig. 3) and an outer position (as shown in Fig. 4) by means of a rod 70 pivotally connected to an operating lever 41.

A projection 42 on the arm 39 is associated with a lug 43 on the arm 35, whereby pivoting of the arm 39 from the outer to the inner position also pivots the blade 34 from the upper to the lower position.

A drive belt 44 passes around the pulley associated with wheel 26 and drives pulley 45. A conveyor belt 46 passes around rollers 47, 48, 49, 50, 51, drive roller associated with pulley 45 and roller 52.

A drive belt 53 passes around the pulley associated with wheel 19 and pulley 54. A drive belt 55 passes around pulley 56 and pulley 57 (coaxial and rotatable with pulley 54). Teeth 58 on the wheel associated with pulley 56 are in mesh with teeth 59 on wheel 60. A conveyor belt 61 passes around the roller associated with wheel 60 and rollers 62, 63, 64, 65, 66, 67, 68 and 69.

An operator stationed at the left side of the apparatus (as seen in Fig. 1) with the blade 34 in the lower position, may feed a dough sheet down this inclined table to between the squeeze rollers. The dough sheet then passes between the upper squeeze roller 11 and the conveyor belt 30 and is displaced to the conveyor belt 46. The latter conveyor belt displaces the dough sheet to within easy reach of the operator. After a required number of passages between the squeeze rollers, the blade 34 may, by means of the operating lever 41, be displaced to the upper position. In this position of the blade, the dough sheet, after passage between the squeeze rollers, falls on to the conveyor belt 61 to be displaced away from the dough break apparatus.

The pulley 54 is stepped, and a clutch device associated therewith enables the pulley 57 to be driven at one of two predetermined speeds. Thus the conveyor belt 61 at one time may have a speed substantially equal to the peripheral speed of the squeeze rollers, and at another time a speed suitable for feeding a dough sheet to, for example, a cutting machine.

I claim:

1. A dough break including, in combination, dough feed means, a first squeeze roller, a second squeeze roller adjacent thereto forming a bight, a gate member mounted on the exit side of the bight between said squeeze rollers, means to move said gate into engagement with one or the other of said rollers, and a conveyor belt having a run disposed around part of one of said rollers, said run entering the bight region on the exit side thereof defining passages between said conveyor and either roller.

2. A dough break including, in combination, dough feed means, a first squeeze roller, a second squeeze roller adjacent thereto forming a bight, a pivoted gate member mounted on the exit side of the bight between said squeeze rollers, means to move said gate into engagement with one or the other of said squeeze rollers, conveyor rollers, one of said conveyor rollers being adjacent the exit side of the bight between said squeeze rollers, a pivoted bracket carrying said one conveyor roller, and a conveyor belt carried by said conveyor rollers and having a run disposed around part of one of said squeeze rollers and said one conveyor roller defining passages between said conveyor and either roller.

JOSEPH FRANCIS NAYLOR.

References Cited in the file of this patent

UNITED STATES PATENTS

| Number | Name | Date |
|---|---|---|
| 94,227 | Maltby | Aug. 31, 1869 |
| 347,790 | Gent | Aug. 24, 1886 |
| 799,715 | Carroll | Sept. 19, 1905 |
| 1,675,363 | Lodding | July 3, 1928 |
| 2,127,076 | Wagner et al. | Aug. 16, 1938 |
| 2,289,388 | LeConie Stiles | July 14, 1942 |